United States Patent
Kojima et al.

(10) Patent No.: US 11,410,406 B2
(45) Date of Patent: Aug. 9, 2022

(54) DELIVERY SERVER, METHOD AND STORAGE MEDIUM

(71) Applicant: YOKOGAWA ELECTRIC CORPORATION, Tokyo (JP)

(72) Inventors: Osamu Kojima, Tokyo (JP); Atsushi Wada, Tokyo (JP)

(73) Assignee: Yokogawa Electric Corporation, Tokyo (JP)

(*) Notice: Subject to any disclaimer, the term of this patent is extended or adjusted under 35 U.S.C. 154(b) by 0 days.

(21) Appl. No.: 17/120,244

(22) Filed: Dec. 13, 2020

(65) Prior Publication Data
US 2021/0192253 A1    Jun. 24, 2021

(30) Foreign Application Priority Data

Dec. 23, 2019   (JP) .............................. JP2019-231475

(51) Int. Cl.
*G06V 10/22* (2022.01)
*G06F 16/535* (2019.01)
(Continued)

(52) U.S. Cl.
CPC ............ *G06V 10/22* (2022.01); *G06F 16/535* (2019.01); *G06V 10/255* (2022.01); *G06V 20/64* (2022.01)

(58) Field of Classification Search
CPC ...... G06K 9/4604; G06K 9/4628; G06K 9/66; G06K 9/00791; G06K 2209/05;
(Continued)

(56) References Cited

U.S. PATENT DOCUMENTS

| | | | |
|---|---|---|---|
| 8,942,434 B1* | 1/2015 | Karakotsios | A61B 3/14 382/117 |
| 2003/0179298 A1* | 9/2003 | Akiyama | H04N 1/6086 348/222.1 |

(Continued)

FOREIGN PATENT DOCUMENTS

| | | |
|---|---|---|
| JP | 2012151547 A | 8/2012 |
| JP | 2015162232 A | 9/2015 |
| WO | 2018101247 A1 | 6/2018 |

OTHER PUBLICATIONS

Extended European Search Report for European Patent Application No. 20214535.5, issued by the European Patent Office dated Mar. 15, 2021.

(Continued)

*Primary Examiner* — Dung Hong

(57) ABSTRACT

A delivery server is connected to a device which uses an image analysis engine to perform an image analysis on image data obtained by a monitoring camera. The delivery server includes an analysis engine storage unit which is configured to store a plurality of image analysis engines for each of which at least one of a shooting condition of the image data appropriate for the image analysis or a target object to be detected among objects which are possibly included in the image data is different; and a supplying unit which is configured to supply to the device an image analysis engine corresponding to at least one of the shooting condition of the image data obtained by the device or the target object which is set for the device, among the plurality of image analysis engines.

9 Claims, 9 Drawing Sheets

(51) Int. Cl.
*G06V 10/20* (2022.01)
*G06V 20/64* (2022.01)

(58) Field of Classification Search
CPC ...... G06K 9/6262; G06K 9/46; G06K 9/4661; G06K 9/52; G06K 2009/00328
See application file for complete search history.

(56) References Cited

U.S. PATENT DOCUMENTS

| | | | | |
|---|---|---|---|---|
| 2004/0101189 | A1* | 5/2004 | Green | G06T 7/0012 382/133 |
| 2006/0061654 | A1* | 3/2006 | McKay | G08B 13/1968 340/539.1 |
| 2013/0022231 | A1* | 1/2013 | Nepomniachtchi | G06V 10/28 382/229 |
| 2013/0287254 | A1* | 10/2013 | Teyssier | G06V 10/993 382/103 |
| 2013/0308825 | A1* | 11/2013 | Yamazaki | H04N 7/18 382/103 |
| 2014/0321759 | A1* | 10/2014 | Kamiya | G06V 10/96 382/217 |
| 2015/0339805 | A1* | 11/2015 | Ohba | H04N 5/2258 345/156 |
| 2016/0284098 | A1* | 9/2016 | Okumura | G06T 7/292 |
| 2017/0070657 | A1 | 3/2017 | Yokomizo | |
| 2017/0208242 | A1 | 7/2017 | Tsunematsu | |
| 2020/0012894 | A1* | 1/2020 | Lee | G06K 9/6262 |
| 2020/0241549 | A1* | 7/2020 | Tsurumi | B60W 40/04 |
| 2020/0311401 | A1* | 10/2020 | Nonaka | G08B 13/19608 |

OTHER PUBLICATIONS

Office Action issued for counterpart European Application 20214535.5, issued by the European Patent Office dated Nov. 9, 2021.

Office Action issued for counterpart Japanese Application No. 2019-231475, issued by the Japan Patent Office dated Jun. 28, 2022(drafted on Jun. 16, 2022).

* cited by examiner

| CAMERA ID/SENSOR ID | LOCATION OF SHOT REGION/ SECURITY REGION |
|---|---|
| c-01 | INSIDE THE BUILDING ENTRANCE |
| c-02 | OUTSIDE THE BUILDING ENTRANCE |
| ... | ... |
| s-01 | ENTRANCE AUTOMATIC DOOR |
| ... | ... |

| DEVICE ID | CAMERA ID | SHOOTING CONDITION |
|---|---|---|
| aaa1 | c-01 | APPLICATION: INDOOR, INSTALLED LOCATION: INDOOR, ... |
| | c-02 | APPLICATION: OUTDOOR, INSTALLED LOCATION: OUTDOOR, ... |
| | ... | ... |
| aaa2 | c-03 | ... |
| ... | | ... |

| DEVICE ID | OBJECT OF DETECTION TARGET |
|---|---|
| aaa1 | HUMAN FACE |
| aaa2 | WHOLE BODY OF HUMAN, VEHICLE... |
| ... | ... |

DELIVERY SERVER, METHOD AND STORAGE MEDIUM

The contents of the following Japanese patent application(s) are incorporated herein by reference:
2019-231475 filed in JP on Dec. 23, 2019

BACKGROUND

1. Technical Field

The present invention relates to a delivery server, a method, and a storage medium.

2. Related Art

In a conventional system which uses a monitoring camera to perform monitoring, an image analyzing unit is provided in a device which is configured to obtain image data from the monitoring camera (for example, see Patent Literature 1).
[Patent Literature 1] Japanese Unexamined Patent Application Publication No. 2015-162232

However, since a conventional system has no mechanism for changing an image analysis engine to be used according to the shooting condition and the target object of each device, some device cannot use the appropriate image analysis engine for performing image analysis.

SUMMARY

To solve the above-described problem, a first aspect of the present invention provides a delivery server which is connected to a device which uses an image analysis engine for performing image analysis on the image data obtained by the monitoring camera. The delivery server may include an analysis engine storage unit for storing a plurality of image analysis engines for each of which at least one of a shooting condition of the image data appropriate for the image analysis or a target object to be detected among the objects which are possibly included in the image data is different. The delivery server may include a supplying unit which supplies to the device the image analysis engine corresponding to at least one of the shooting condition of the image data obtained by the device or the target object which is set for the device, among the plurality of image analysis engines.

A second aspect of the present invention provides a method. The method may include an analysis engine storing step to store a plurality of image analysis engines for each of which at least one of a shooting condition of the image data appropriate for the image analysis or a target object to be detected among the objects which are possibly included in the image data is different. The method may include a supplying step to supply, to the device which uses the image analysis engine for performing image analysis on the image data obtained by the monitoring camera, the image analysis engine corresponding to at least one of the shooting condition of the image data obtained by the device or the target object which is set for the device, among the plurality of image analysis engines.

A third aspect of the present invention provides a storage medium in which a program is recorded. The program may cause a computer of the delivery server connected to a device which uses the image analysis engine for performing image analysis on the image data obtained by the monitoring camera to serve as the analysis engine storage unit which stores the plurality of image analysis engines for each of which at least one of a shooting condition of the image data appropriate for the image analysis or a target object to be detected among the objects which are possibly included in the image data is different. The program may cause a computer to serve as a supplying unit which supplies to the device the image analysis engine corresponding to at least one of the shooting condition of the image data obtained by the device or the target object which is set for the device, among the plurality of image analysis engines.

The summary clause does not necessarily describe all necessary features of the embodiments of the present invention. The present invention may also be a sub-combination of the features described above.

BRIEF DESCRIPTION OF THE DRAWINGS

FIG. 2 shows a stored content of a position storage unit 43.

FIG. 3 shows a stored content of a shooting condition storage unit 62.

FIG. 4 shows a stored content of a detection target storage unit 63.

DESCRIPTION OF EXEMPLARY EMBODIMENTS

Hereinafter, the present invention will be described through the embodiments of the invention. However, the embodiments described below are not to limit the claimed invention. In addition, all of the combinations of the features described in the embodiments are not necessarily required in the solution of the invention.

1. First Embodiment

[1-1. System 1]

Figure 1:
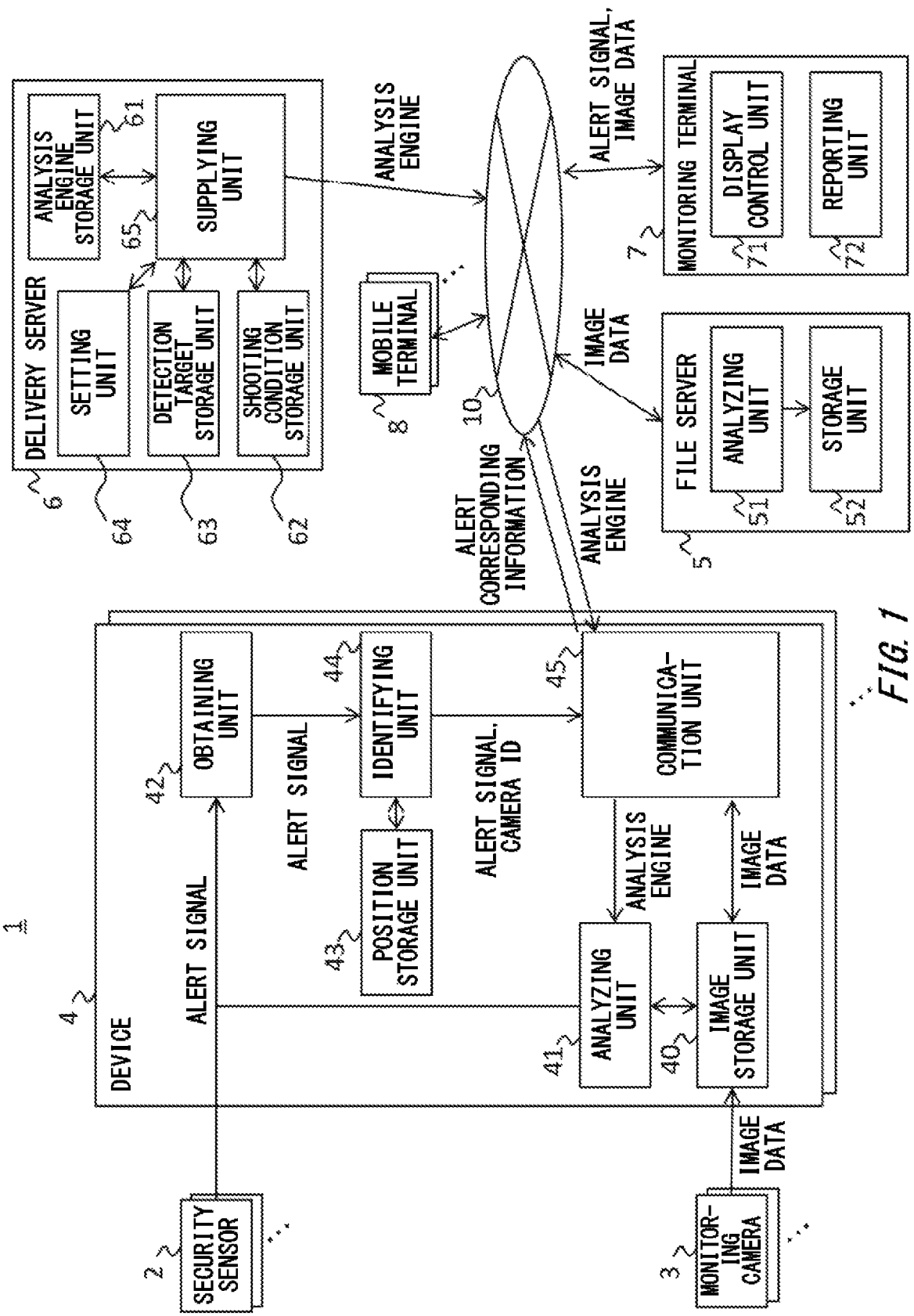
FIG. 1 shows a system 1 according to the first embodiment.

FIG. 1 shows the system 1 according to the first embodiment.

The system 1 includes one or more security sensors 2, one or more monitoring cameras 3, one or more devices 4, a file server 5, a delivery server 6, a monitoring terminal 7, and one or more mobile terminals 8, and performs a remote monitoring of the monitored region.

The monitored region may be a region monitored by the monitoring terminal 7, and may include a region where abnormalities are to be detected by the security sensor 2 (also referred to as a security region) and a region shot by the monitoring camera 3 (also referred to as a shot region). In the present embodiment, the monitored region is a site of a facility as one example, but it may also be a road, a sideway, or the like. The facility may be a plant, or may be a school, a house, a station, a museum, or the like. Examples of the plant include an industrial plant such as a chemical plant or a biological plant, as well as a plant for managing and controlling a wellhead or its surrounding area of a gas field, an oil field or the like, a plant for managing and controlling power generation such as hydraulic power generation, thermal power generation and nuclear power generation, a plant for managing and controlling energy harvesting such as solar photovoltaic generation, wind power generation or the like, and a plant for managing and controlling water and sewerage, a dam or the like.

Herein, among each component of the system 1, the device 4, the file server 5, the delivery server 6, the monitoring terminal 7, and the mobile terminal 8 may be connected with each other via a communication network 10. In the figure, the device 4, the file server 5, the delivery server 6, the monitoring terminal 7, and the mobile terminal 8 are connected via the single communication network 10, but they may be connected via separate communication networks. In addition, each of the security sensors 2 and the monitoring terminal 7 may be further connected via a relay device or a communication network which is not shown.

The communication network 10 may be composed by including various networks such as the Internet, Wide Area Network (WAN), and Local Area Network, or the combination thereof. The communication network 10 may include a connection point which uses at least one of wired communication or wireless communication. The communication network 10 may be achieved by a dedicated line separated from a public line such as the Internet.

[1-1.1. Security Sensor 2]

Each of the security sensors 2 detects abnormalities in the security region and thereby detects abnormalities in the monitored region. Each of the security sensors 2 may be any of an intrusion detection sensor which detects an intrusion into the monitored region, a human sensor which detects a human body within the monitored region, an opening and closing sensor which detects the opening and closing of at least one of a door or a window within the monitored region. Each sensor may be an ultrasound sensor, a microwave sensor, an infrared sensor, a wire sensor, a trap sensor, an electric field sensor, a magnet sensor, or the like.

Each of the security sensors 2 may output an alert signal in response to a detection of an abnormality. The alert signal may include the occurrence time of the alert signal and the identification information (also referred to as sensor ID) of the security sensor 2 which is the source of the alert signal. The occurrence time of the alert signal may be a time when the abnormality is detected by the security sensor 2.

Each of the security sensors 2 may supply the alert signal to the device 4. Each of the security sensors 2 may also supply the alert signal to another device (as one example, the monitoring terminal 7).

[1-1.2. Monitoring Camera 3]

Each of the monitoring cameras 3 performs a shooting of the shot region. Each of the monitoring cameras 3 may supply to the device 4 the image data obtained through the shooting. The monitoring camera 3 may be a camera for a visible light or may be a camera for an infrared light or an ultraviolet light (as one example, X-ray).

Note that the number of the monitoring cameras 3 included in the system 1 may be equal to or may be different from the number of the security sensors 2. For example, the system 1 may include the same number of monitoring cameras 3 as that of the security sensors 2 so that the monitoring camera 3 is installed for each of the security sensors 2. In addition, the number of the monitoring cameras 3 included in the system 1 may be smaller than that of the security sensor 2 so that the monitoring camera 3 is installed for each group of the plurality of security sensors 2. The shot region of the monitoring camera 3 may be the same as or may be at least partially different from the security region of the security sensor 2.

[1-1.3. Device 4]

Each of the devices 4 is connected to at least one security sensors 2 and at least one monitoring cameras 3. Each of the devices 4 has an image storage unit 40, an analyzing unit 41, an obtaining unit 42, a position storage unit 43, an identifying unit 44, and a communication unit 45.

[1-1.3.1. Image Storage Unit 40]

The image storage unit 40 stores the image data obtained by the monitoring camera 3. The image storage unit 40 may store each image data obtained by the plurality of monitoring cameras 3.

The image storage unit 40 may store the image data shot by each of the monitoring cameras 3 in association with the date and time of the shooting and the identification information (also referred to as camera ID) of the monitoring camera 3. The image storage unit 40 may save the image data for at least a reference period (as one example, five days) and may successively overwrite with the new image data. The capacity of the image storage unit 40 may be 1 TB as one example.

[1-1.3.2. Analyzing Unit 41]

The analyzing unit 41 performs an image analysis on image data and outputs an alert signal in response to a detection of a target object to be detected among objects which is possibly included in the image data. The target object may be set for the device 4 by an operator in advance or may be optionally changed. The analyzing unit 41 may perform the image analysis on the image data stored in the image storage unit 40 or may supply the alert signal to the obtaining unit 42.

The alert signal output from the analyzing unit 41 includes at least an occurrence time of the alert signal and a camera ID of the monitoring camera 3 which shot the image data. The alert signal may further include information (as one example, the type, feature, position in the image data of the target object, or the like) of the target object and the indication that the source of the alert signal is the analyzing unit 41. The occurrence time of the alert signal may be the shooting time of the image data in which the target object is detected.

Note that the target object may be an object to be noticed for a security reason among the objects which can be detected through the image analysis. For example, the target object may be at least one of a human face, a whole body of a human (as one example, an adult or a child), clothes, a vehicle (a vehicle in motion, a vehicle which is stopped), a car model, a car color, a license plate, a particular object (a bag, a weapon), or the like. In addition, the target object may be a face of a particular person or a particular vehicle. The target object may also be a person or a vehicle which moves across images (across frames) or may be an action performed across a plurality of images.

The analyzing unit 41 is one example of the first analyzing unit and may perform the image analysis on the image data through one or more image analysis engines (not shown). As one example, in the present embodiment, the analyzing unit 41 may perform the image analysis by operating the plurality of image analysis engines in parallel or by operating it at different timings.

Operating the plurality of image analysis engines at different timings may mean, for example, operating one image analysis engine in a period when the image analysis is performed on the image data shot during the daytime and operating another image analysis engine in a period when the image analysis is performed on the image data shot in the nighttime. Operating the plurality of image analysis engines at different timings may also mean operating one image analysis engine in a period when the image analysis is performed on the image data shot with a follow light and operating another image analysis engine in a period when the image analysis is performed on the image data shot with a back light. Operating the plurality of image analysis engines at different timings may also mean operating one image analysis engine in a period when the image analysis is performed on the image data shot in the environment of the sunny weather and operating another image analysis engine in a period when the image analysis is performed on the image data shot in the environment of the cloudy or rainy weather. Operating the plurality of image analysis engines at different timings may also mean operating a different image analysis engine for each reference interval (as one example, one minute). Operating the plurality of image analysis engines at different timings may also mean operating a different image analysis engine such that the target objects are switched during a period when the same (or similar) objects are included in the image data. Switching the target object during a period when the same (or similar) objects are included in the image data may mean, as one example, switching the target object between a face and an action during a period when a person is included in the image data as the object, or may mean switching the target object between a car model and a license plate during a period when a car is included in the image data as the object.

At least one of the target object or the shooting condition of the image data appropriate for the image analysis may be different among the plurality of image analysis engines. The shooting condition of the image data may be the condition determined by the monitoring camera 3 which performs the shooting or may be the condition determined by the installation situation of the monitoring camera 3 or the timing of shooting. For example, the shooting condition of the image data may be at least one of the performance of the monitoring camera 3 which performs the shooting (such as the number of pixels, a frame rate, or the like), the application (indoor, outdoor, or the like), the shooting direction (the bearing, the orientation relative to the light source, the orientation relative to the target object which is possibly included in the image data, or the like), the installed location, (the address, the GPS data, the position relative to the target object which is possibly included in the image data, indoor, outdoor, or the like), the number of target objects possibly included in the image data (single or multiple), the situation of the target object possibly included in the image data (moving, stopped, or the like), the hours of the shooting, the situation of the shot region at a time of the shooting (the color and brightness of the illumination, the weather, or the like), or the like.

Note that the image analysis engine may be a model obtained through the machine learning such as the deep learning as one example, but it is not limited thereto.

[1-1.3.3. Obtaining Unit 42]

The obtaining unit 42 obtains the alert signal occurring depending on the situation within a monitored region. The obtaining unit 42 may obtain the alert signal from at least one of the security sensors 2, or may obtain the alert signal from the analyzing unit 41. The obtaining unit 42 may supply the obtained alert signal to the identifying unit 44.

[1-1.3.4. Position Storage Unit 43]

The position storage unit 43 stores the position of the shot region of each of the plurality of monitoring cameras 3. The position storage unit 43 may further store the position of the security region of each of the plurality of security sensors 2.

[1-1.3.5. Identifying Unit 44]

The identifying unit 44 identifies each of the monitoring cameras 3 having the shot region corresponding to the location where the cause of the alert signal occurs, among the plurality of monitoring cameras 3. The identifying unit 44 may refer to the position storage unit 43 to identify the monitoring camera 3. The identifying unit 44 may supply the camera ID of the identified monitoring camera 3 and the alert signal to the communication unit 45.

Herein, if the alert signal is output from the security sensor 2, the cause of the alert signal may be an abnormality of a target to be detected by the security sensor 2 and the location where the cause of the alert signal occurs may be in the security region of the security sensor 2 which outputs the alert signal. In this case, the identifying unit 44 may refer to the position storage unit 43 to identify each of the monitoring cameras 3 having the shot region corresponding to the security region of the security sensor 2 which outputs the alert signal. The shot region corresponding to the location of the security region of the security sensor 2 may be the shot region within a reference distance from the security region, may be the shot region in the same floor or building as the security region, or may be the shot region on the route including the security region.

If the alert signal is output from the analyzing unit 41, the cause of the alert signal may be the target object and the location where the cause of the alert signal occurs may be the shot region of the monitoring camera 3 which shoots the image data where the target object is detected. In this case, the identifying unit 44 may identify the monitoring camera 3 corresponding to the camera ID included in the alert signal.

[1-1.3.6. Communication Unit 45]

The communication unit 45 communicates with the file server 5 or the like via the communication network 10.

The communication unit 45 is one example of the transmitting unit and transmits to the file server 5 the alert corresponding information including in-the-period image data during a reference duration including an occurrence time of the alert signal, among the image data stored in the image storage unit 40, and the content of the alert signal. In response to one alert signal being obtained by the obtaining unit 42, the communication unit 45 may transmit the in-the-period image data obtained by each of the monitoring cameras 3 identified by the identifying unit 44 among a plurality of monitoring cameras 3 during a reference duration including the occurrence time of the one alert signal and the alert corresponding information including the content of the one alert signal. The reference duration is two minutes as one example in the present embodiment, but it may be a different duration such as 10 minutes, one day, or the like. Transmitting the in-the-period image data may be transmitting a copy of the in-the-period image data.

Note that the communication unit 45 may transmit the alert corresponding information further including identification information of the device 4 (also referred to as a device ID) or the camera ID of the monitoring camera 3 identified by the identifying unit 44, that is, the monitoring camera 3 which shoots the in-the-period image data.

Furthermore, if the communication unit 45 receives no alert signal supplied from the identifying unit 44, it may transmit the thumbnail image of the image data obtained by each of the monitoring cameras 3 to the file server 5 or the monitoring terminal 7 at periodic timings. Furthermore, the communication unit 45 may transmit the image data stored in the image storage unit 40 to the file server 5 before the image data is overwritten. In this case, the communication unit 45 may compress and transmit the image data. However, if the image data to be transmitted before overwritten includes image data already transmitted as the in-the-period image data, the communication unit 45 may transmit the image data in the duration (as one example, 30 minutes) including the in-the-period image data without compression. Thereby, the image data shot at a time close to the in-the-period image data can be saved in the file server 5.

[1-1.4. File Server 5]

The file server 5 is accessible to another apparatus (in the present embodiment, the monitoring terminal 7 or the mobile terminal 8, as one example) different from the device 4 and shares the stored file with other apparatuses. The file server 5 may be simultaneously accessible to a plurality of apparatuses without increasing the communication cost. The file server 5 has an analyzing unit 51 and a storage unit 52.

[1-1.4.1. Analyzing Unit 51]

The analyzing unit 51 is one example of the second analyzing unit and uses the image analysis engine to perform the image analysis on the in-the-period image data corresponding to the alert corresponding information (in the present embodiment, the in-the-period image data included in the alert corresponding information). If the file server 5 receives the alert corresponding information including the alert signal from the analyzing unit 41 of the device 4, the analyzing unit 51 may perform the image analysis. The analyzing unit 51 may attempt to detect the same target object as that of the analyzing unit 41 of the device 4 of the transmission source of the alert corresponding information by performing the image analysis. For example, the analyzing unit 51 may attempt to detect the same type of target object based on the type of the target object included in the alert signal.

The image engine of the analyzing unit 51 may have a higher processing capability required for the image analysis and may have a higher precision of the image analysis than the image analysis engine of the analyzing unit 41. As one example, if each image analysis engine of the analyzing unit 41 and the analyzing unit 51 is a neural network, the image analysis engine of the analyzing unit 51 may be a neural net which has a larger number of hierarchies than that of the image analysis engine of the analyzing unit 41. The analyzing unit 51 may supply the analysis result to the storage unit 52.

[1-1.4.2. Storage Unit 52]

The storage unit 52 stores the alert corresponding information transmitted from the device 4. The storage unit 52 may store only the alert corresponding information corresponding to the in-the-period image data in which the target object is detected by the analyzing unit 51, among the alert corresponding information transmitted by the device 4. For the alert corresponding information including the alert signal from the security sensor 2, the storage unit 52 may store each of the alert corresponding information regardless of the analysis result by the analyzing unit 51.

The storage unit 52 may further store the image data of the thumbnail image transmitted from the device 4 when no alert signal occurs or the image data transmitted by the device 4 before deleted due to overwriting in association with the device ID of the transmission source. The storage unit 52 may have a larger capacity than the image storage unit 40.

[1-1.5. Delivery Server 6]

The delivery server 6 delivers the image analysis engine to each of the devices 4. The delivery server 6 has an analysis engine storage unit 61, a shooting condition storage unit 62, a detection target storage unit 63, a setting unit 64, and a supplying unit 65.

[1-1.5.1. Analysis Engine Storage Unit 61]

The analysis engine storage unit 61 stores a plurality of image analysis engines. At least one of the target object or the shooting condition of the image data appropriate for the image analysis may be different among the plurality of image analysis engines. If the image analysis engine is generated by machine learning, each image analysis engine stored in the analysis engine storage unit 61 may be updated through the learning of whether the analysis result is correct.

[1-1.5.2 Shooting Condition Storage Unit 62]

For each of the plurality of devices 4, the shooting condition storage unit 62 stores the shooting condition of the image data obtained by the device 4. If the shooting condition changes, the shooting condition storage unit 62 may store a plurality of shooting conditions. The stored shooting condition may be set by the operator.

Alternatively, the shooting condition to be stored may be set based on the result of the image analysis performed on the image data output from the device 4 using each image analysis engine within the analysis engine storage unit 61. For example, the image analysis may be performed on the image data from one device 4 using two or more image analysis engines each having a different shooting condition of the image data appropriate for the image analysis or the same target object, among the plurality of image analysis engines within the analysis engine storage unit 61. Then, the shooting condition corresponding to the image analysis engine which has detected the largest number of the target objects as a result of the image analysis may be set as the shooting condition of the image data obtained by the one device 4. The image data which is the target for the image analysis may be the image data such as the thumbnail image stored in, for example, the file server 5.

[1-1.5.3 Detection Target Storage Unit 63]

For each of the plurality of devices 4, the detection target storage unit 63 stores the target object which is set for the device 4. The detection target storage unit 63 may store two or more target objects for one device 4. The target object to be stored may be set by the operator or may be optionally changed.

[1-1.5.4. Setting Unit 64]

The setting unit 64 sets the operating condition of each image analysis engine in each of the devices 4. The operating condition of the image analysis engine may be the condition of determining the timing at which the image analysis engine performs the image analysis or may be the shooting condition of the image data which is the target of the image analysis. As one example, the operating condition may be that the image data is shot in the daytime or the nighttime. In this case, the image analysis engine performs the image analysis on the image data shot in the daytime or the nighttime.

For the analyzing unit 41 of each of the devices 4, the setting unit 64 may set the operating condition of the image analysis engine used by the analyzing unit 41 via the supplying unit 65. Thereby, the analyzing unit 41 of each of the devices 4 causes each of the image analysis engines to operate with the set operating condition.

[1-1.5.5. Supplying Unit 65]

The supplying unit 65 supplies, to at least one device 4, any of the plurality of image analysis engines stored in the analysis engine storage unit 61. The supplying unit 65 may supply to the device 4 the image analysis engine corresponding to at least one of the shooting condition of the image data obtained by the device 4 or the target objects which are set in the device 4.

The supplying unit 65 may refer to the shooting condition storage unit 62 to identify the shooting condition of the image data obtained by the device 4. The supplying unit 65 may refer to the detection target storage unit 63 to identify the target object which is set by the device 4.

The supplying unit 65 may supply the same image analysis engines to each of two or more of the devices 4 which obtain the image data having at least partially the same shooting condition, among the plurality of devices 4 included in the system 1. Thereby, for example, if each of the two or more of the devices 4 obtains the image data shot in the same hours, the image analysis engine appropriate for the image data shot in the hours is supplied to each of the two or more of the devices 4.

The supplying unit 65 may supply the same image analysis engine to each of the two or more of the devices 4 having the same target object, among the plurality of devices 4 included in the system 1. The supplied image analysis engine may be received by the communication unit 45 of the device 4 and used by the analyzing unit 41.

[1-1.6. Monitoring Terminal 7]

The monitoring terminal 7 performs the monitoring of the monitored region. The monitoring terminal 7 has a display control unit 71 and a reporting unit 72.

[1-1.6.1. Display Control Unit 71]

If the device 4 outputs alert corresponding information, the display control unit 71 displays the in-the-period image data included in the alert corresponding information and the content of the alert signal. If the source of the alert signal is the security sensor 2, displaying the content of the alert signal may mean indicating the occurrence time of the alert signal, the sensor ID of the security sensor 2, and the content of the abnormality detected by the security sensor 2 of the sensor ID. If the source of the alert signal is the analyzing unit 41, displaying the content of the alert signal may mean indicating the occurrence time of the alert signal, the information on the target object, and the camera ID of the monitoring camera 3.

If the device 4 outputs no alert corresponding information, the display control unit 71 may list the thumbnail images of the image data obtained from each of the monitoring cameras 3 via each of the devices 4. If one or more pieces of alert corresponding information are output in such a state, the thumbnail images of the image data obtained by the monitoring camera 3 with each camera ID included in the alert corresponding information may be identified and displayed. Then, in response to the selection by the operator of the thumbnail image of any of the monitoring cameras 3, the display control unit 71 may display the in-the-period image data obtained by the monitoring camera 3 and the alert signal corresponding to the in-the-period image data.

Alternatively, if one or more pieces of alert corresponding information are output with the thumbnail image listed, the display control unit 71 may list and display the contents of the alert signal included in each alert corresponding information and display the content of the alert signal and the in-the-period image data corresponding to the alert signal in response to the selection of any of the alert signals by the operator.

Furthermore, if the device 4 outputs no alert corresponding information with the thumbnail images listed, the display control unit 71 may, in response to the selection of the thumbnail image of any of the monitoring cameras 3 by the operator, display the image data obtained from the monitoring camera 3 by reading it from the image storage unit 40 of the device 4.

[1-1.6.2. Reporting Unit 72]

In response to the transmission of alert corresponding information from one device 4 among the plurality of devices 4, the reporting unit 72 performs a reporting to a report destination corresponding to the one device 4. The reporting unit 72 may have a table (not shown) which associates each of the devices 4 to a report destination and may refer to this table to determine the report destination. The reporting may be performed through a data communication, and the communicated data may include alert corresponding information.

In the present embodiment, the report destination may be the security company in the area including the monitored region of the device 4 as one example, but it may also be a police station, a fire station, or an emergency hospital.

[1-1.7. Mobile Terminal 8]

Each of the mobile terminals 8 is carried by a security guard of a security company in each area. The mobile terminal 8 may be able to access the file server 5.

[1-2. Advantage Obtained Through the System 1]

According to the delivery server 6 of the above-described system 1, the device 4 is supplied with the image analysis engine corresponding to at least one of the shooting condition of the image data obtained by the device 4 or the target object which is set for the device 4, among the plurality of image analysis engines stored in the analysis engine storage unit 61. Thereby, the device 4 can perform the image analysis using an appropriate analysis engine. For example, if the shooting conditions of the image data are different among the monitoring cameras 3, the device 4 can perform the image analysis by using the image analysis engine corresponding to the shooting condition of the monitoring camera 3. Furthermore, if the target object is changed, the device 4 can perform the image analysis by using the image analysis engine corresponding to the target object after the change.

Furthermore, since the same image analysis engines are supplied to each of two or more of the devices 4 which obtain the image data having at least partially the same shooting condition, the image analysis can be performed with the same image analysis engine on the image data which is obtained by each of the devices 4 and has at least partially the same shooting condition.

Furthermore, since the same image analysis engines are supplied to each of two or more of the devices 4 having the same target objects, each of the devices 4 which should detect the same target object can perform the image analysis by using the same image analysis engine.

Furthermore, since the operating condition of each image analysis engine within the device 4 is set by the setting unit 64, the device 4 for which any operating condition is set in advance can perform the image analysis with any operating condition.

Furthermore, according to the device 4 of the above-described system 1, since the in-the-period image data within the reference duration including the occurrence time when the alert signal occurs depending on the situation within the monitored region and the alert corresponding information including the content of the alert signal among the image data stored in the image storage unit 40 are transmitted to the file server 5, the cost of communication can be reduced in comparison with the case in which the image data during the entire period of the shooting is transmitted to the file server 5. Furthermore, unlike the case in which the image data is not transmitted to the file server 5 but is saved only in the image storage unit 40 of the device 4, the time and cost required for accessing the image data can be reduced.

Furthermore, each image data obtained by the plurality of monitoring cameras 3 is stored in the image storage unit 40 of the device 4 and the alert corresponding information is transmitted to the file server. Therefore, the cost for communication can be significantly reduced in comparison with the case in which the image data of the entire period of the shooting by each of the monitoring cameras 3 is transmitted to the file server 5. Note that, since the file server 5 is appropriate for the simultaneous access from a plurality of apparatuses and can allow for the constant cost of communication regardless of the amount of the communicated data except the communication with the mobile terminal 8, the communication cost can remain constant even with the repeated access to image data.

Furthermore, since each of the monitoring cameras 3 having the shot region corresponding to the location where the cause of an alert signal occurs among the plurality of monitoring cameras 3 is identified in response to the alert signal being obtained and the alert corresponding information including the in-the-period image data obtained by each of the monitoring cameras 3 which is identified is transmitted, each of the situations of the regions related to the alert can be checked.

Furthermore, since the alert signal from the security sensor 2 is obtained by the obtaining unit 42, the alert signal is obtained in response to a danger approaching in the monitored region and the alert corresponding information is transmitted to the file server 5. Therefore, monitoring via the file server 5 can avoid the danger in the monitored region.

Furthermore, since the alert signal is output in response to the detection of the target object which is set for the device 4 as a result of the image analysis performed on the image data, presetting any target object (as one example, an object which possibly causes a danger) allows the alert corresponding information to be transmitted to the file server 5 in the presence of the target object. Therefore, through the monitoring via the file server 5, a target object present in the monitored region can be found early.

Furthermore, since a plurality of image analysis engines operates in parallel or at different timings in the analyzing unit 41, a target object which is present in the monitored region can be assured to be detected.

Furthermore, according to the monitoring terminal 7, since the content of the alert signal included in the alert corresponding information and the in-the-period image data corresponding to the alert signal are displayed by the monitoring terminal 7, the monitored region can be monitored based on the alert signal and the in-the-period image data in an integrated manner.

Furthermore, since in response to the transmission of the alert corresponding information from one device 4 among the plurality of devices 4 the reporting to the report destination corresponding to the one device 4 is performed, a personnel can be dispatched early to the monitored region.

Furthermore, according to the device 4 and the file server 5, the device 4 uses one image analysis engine to perform the image analysis on image data and outputs the alert signal in response to the detection of the target object. Furthermore, the file server 5 uses another image analysis engine to perform the image analysis on the in-the-period image data corresponding to the alert corresponding information and stores only the alert corresponding information corresponding to the in-the-period image data where the same target object as that of the device 4 is detected. Therefore, unnecessary in-the-period image data where the image analysis in the file server 5 detects no target object can be prevented from being uselessly stored in the file server 5.

Furthermore, since the image analysis engine in the analyzing unit 41 of the device 4 requires less processing capability needed for the image analysis than the image analysis engine in the analyzing unit 41 of the file server 5, the load of the image analysis on the device 4 can be reduced.

[1-2. Position Storage Unit 43]

FIG. 2 shows the stored content of the position storage unit 43. In the present embodiment, as one example, the position storage unit 43 stores the camera ID (for example, such as "c-01") of the monitoring camera 3 and the position of the shot region (for example, such as "inside the building entrance") in association with each other. Furthermore, the position storage unit 43 stores the sensor ID (for example, such as "s-01") of the security sensor 2 and the position of the security region (for example, such as "the entrance automatic door") in association with each other.

[1-3. Shooting Condition Storage Unit 62]

FIG. 3 shows the stored content of the shooting condition storage unit 62. In the present embodiment, as one example, the shooting condition storage unit 62 stores, for each of the plurality of devices 4, the device ID (for example, such as "aaa1") of the device 4, the camera ID (for example, such as "c-01") of the monitoring camera 3 connected to the device 4, and the shooting condition of the image data (for example, the monitoring camera 3 is for the indoor application and the installed location is indoor, or the like) in association with each other.

[1-4. Detection Target Storage Unit 63]

FIG. 4 shows the stored content of the detection target storage unit 63. In the present embodiment, as one example, the detection target storage unit 63 stores, for each of the plurality of devices 4, the device ID (for example, such as "aaa1") of the device 4 and the target object (for example, such as "a human face") which is set for the device 4 in association with each other.

[1-5. The Operation of the System 1]

[1-5.1. The Delivery of the Image Analysis Engine]

Figure 5:
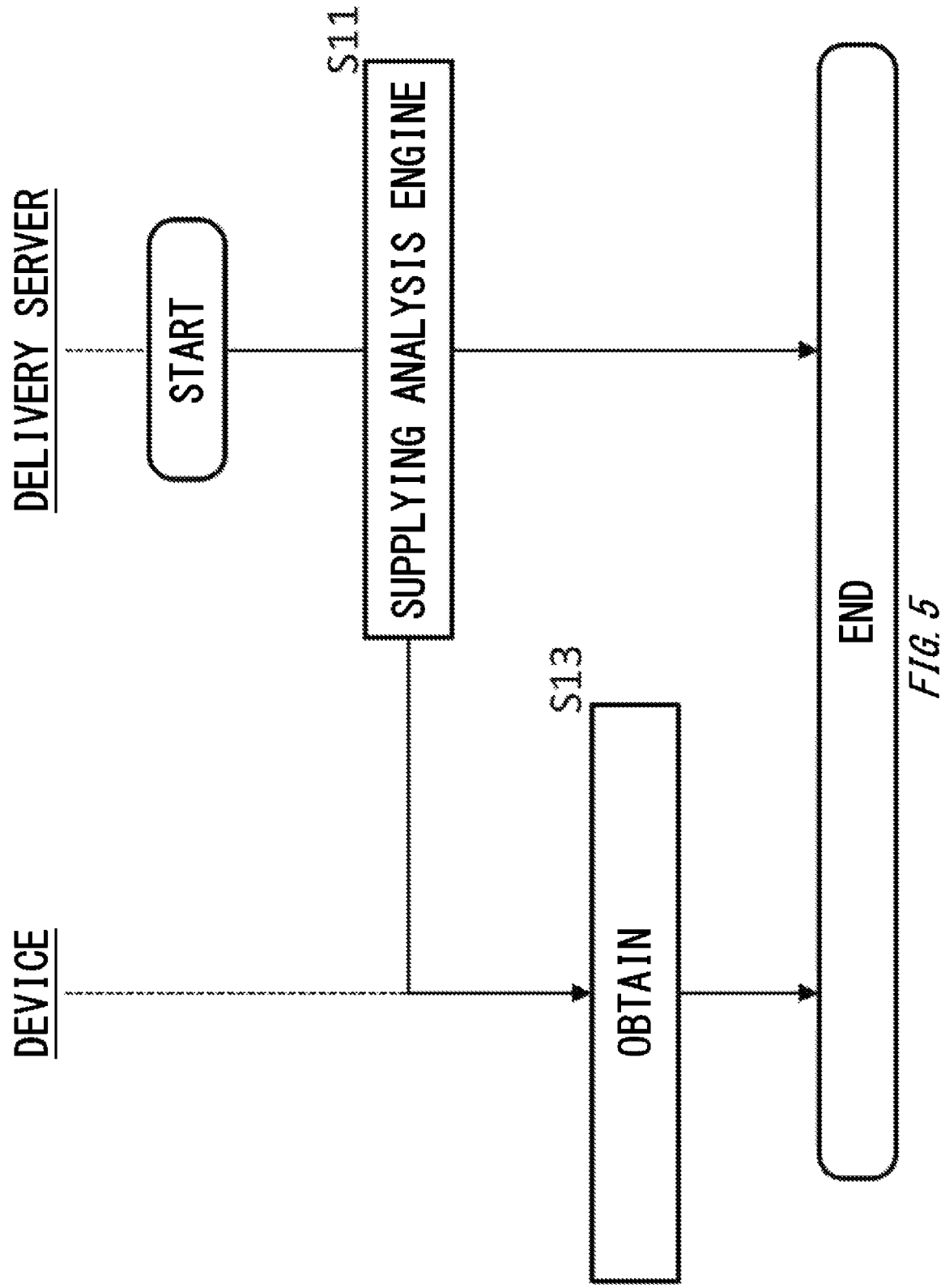
FIG. 5 shows an operation related to the delivery of the image analysis engine.

FIG. 5 shows the operation related to the delivery of the image analysis engine. The system 1 delivers the image analysis engine to each of the devices 4 by performing the processes of steps S11 to S13. Note that at the start of this operation the analysis engine storage unit 61 of the delivery server 6 may have already stored the plurality of image analysis engines for each of which at least one of a shooting condition of the image data appropriate for the image analysis or a target object to be detected is different. Each image analysis engine may include the information indicating the detection object to be detected by the image analysis and the shooting condition of the image data appropriate for the image analysis.

At step S11, the supplying unit 65 supplies to the device 4 any of the plurality of image analysis engines stored in the analysis engine storage unit 61. The supplying unit 65 may refer to at least one of the shooting condition storage unit 62 or the detection target storage unit 63 to supply to the device the image analysis engine corresponding to at least one of the shooting condition of the image data obtained by the device 4 or the target objects which is set in the device 44. Note that in this step S11 the supplying unit 65 may receive from the setting unit 64 the operating condition of the image analysis engine to be supplied and further supply it to the device 4.

The supplying unit 65 may update the image analysis engine in the device 4 with the image analysis engine to be supplied or may add into the device 4 the image analysis engine to be supplied. For example, the supplying unit 65 may instruct the analyzing unit 41 of the device 4 to update or add the image analysis engine. If the supplying unit 65 instructs the update of the image analysis engine, it may designate the image analysis engine to be updated among the one or more image analysis engines used by the analyzing unit 41.

The supplying unit 65 may supply the image analysis engine in response to the operation by the operator. For example, if at least one of the update or the addition of the image analysis engine stored in the analysis engine storage unit 61 is performed in response to the operation by the operator, the supplying unit 65 may supply the image analysis engine to the device 4. In this case, the supplying unit 65 may detect the detection object of each image analysis engine which is updated or added and the shooting condition of the image data appropriate for the image analysis and supply the image analysis engine to the device 4 corresponding to at least one of these detection object or shooting condition.

Furthermore, if the information of at least one of the detection target storage unit 63 or the shooting condition storage unit 62 in response to the operation by the operator is changed, the supplying unit 65 may supply the image analysis engine. In this case, the supplying unit 65 may supply the image analysis engine corresponding to the detection object after the change, to each of the devices 4 corresponding to the detection object changed in the detection target storage unit 63. Furthermore, the supplying unit 65 may supply the image analysis engine corresponding to the shooting condition after the change, to each of the devices 4 corresponding to the shooting condition changed in the shooting condition storage unit 62.

At step S13, the analyzing unit 41 of the device 4 obtains the image analysis engine via the communication unit 45. If instructed to update the image analysis engine by the supplying unit 65, the analyzing unit 41 updates any of the image analysis engines with the supplied image analysis engine. If instructed to add the image analysis engine by the supplying unit 65, the analyzing unit 41 adds the supplied image analysis engine to the target for use. If receiving the operating condition of the image analysis engine from the supplying unit 65, the analyzing unit 41 performs setting such that the supplied image analysis engine is operated with the operating condition.

According to the above-described operation, since the image analysis engine in the device 4 is updated with the supplied image analysis engine, the device 4 can use a new image analysis engine to perform the image analysis even in the presence of the limitation on the storage area in the device 4.

Furthermore, since the supplied image analysis engine is added into the device 4, the device 4 can use a plurality of image analysis engines to perform the image analysis.

[1-5.2. Monitoring]

Figure 6:
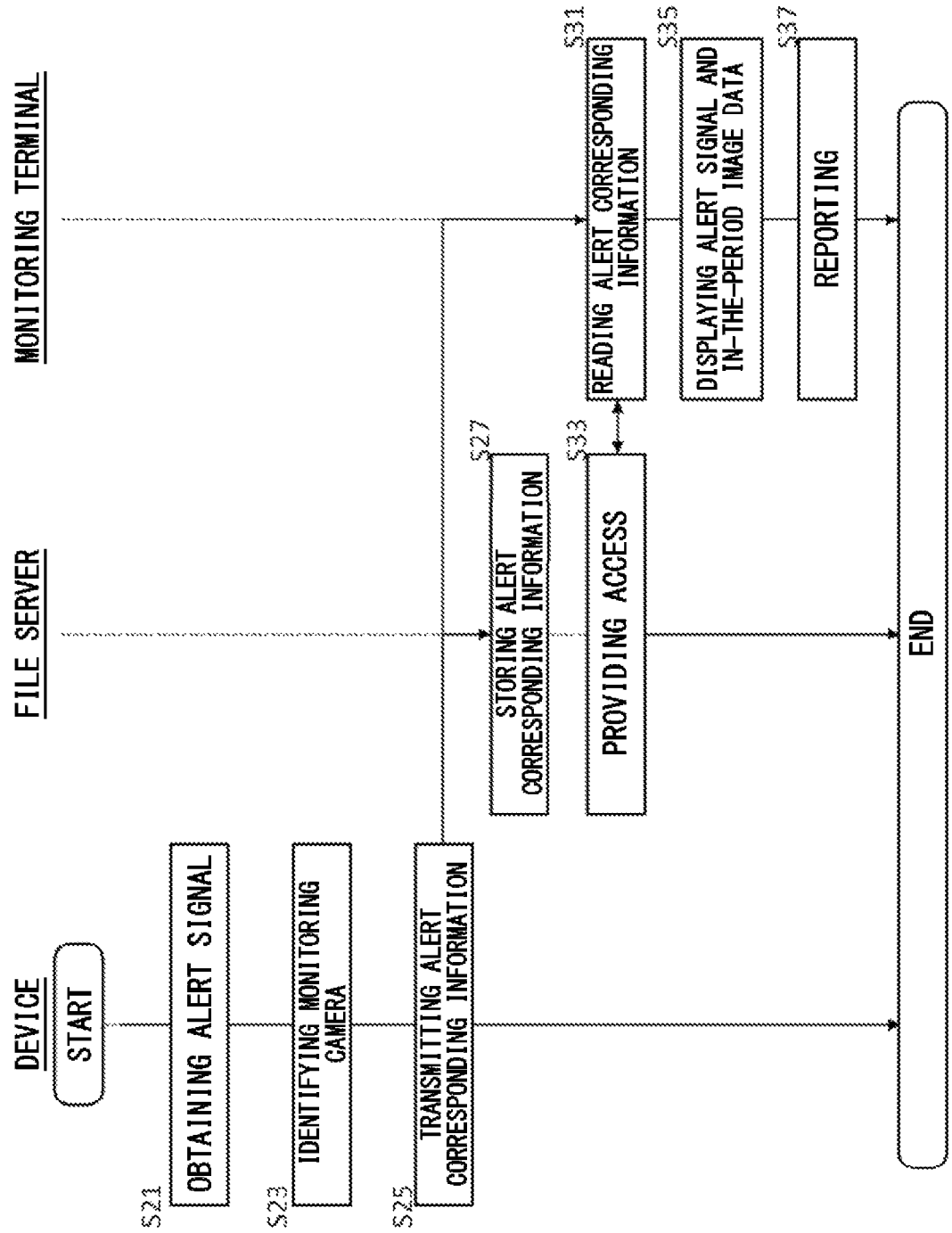
FIG. 6 shows an operation related to the monitoring is different.

FIG. 6 shows the operation related to the monitoring. The system 1 monitors the monitored region by performing the processes of steps S21 to S37. Note that the device 4 may cause the image data obtained by the monitoring camera 3 to be stored in the image storage unit 40 during this operation. Furthermore, the analyzing unit 41 of the device 4 may use one or more image analysis engines to perform the image analysis on the obtained image data.

At step S21, the obtaining unit 42 of the device 4 obtains the alert signal in response to the output of the alert signal from at least one of the security sensor 2 or the analyzing unit 41.

At step S23, the identifying unit 44 identifies each of the monitoring cameras 3 having the shot region corresponding to the location where the cause of the alert signal occurs, among the plurality of monitoring cameras 3.

At step S25, the communication unit 45 transmits to the file server 5 the alert corresponding information including in-the-period image data during a reference duration including the occurrence time of the alert signal, among the image data obtained by each of the identified monitoring cameras 3 and stored in the image storage unit 40, and the content of the alert signal. The communication unit 45 may also transmit to the monitoring terminal 7 or the mobile terminal 8 the indication that the alert corresponding information has been output. In the present embodiment, as one example, the communication unit 45 transmits only the content of the alert signal to the monitoring terminal 7 or the mobile terminal 8, but it may also transmit the alert corresponding information itself along with the in-the-period image data. Note that in FIG. 6 the device 4 ends the process after the transmission of the alert corresponding information, but the process may continue to step S21.

At step S27, the storage unit 52 of the file server 5 stores the alert corresponding information. If the alert corresponding information including the alert signal output from the analyzing unit 41 of the device 4 is received by the file server 5, the analyzing unit 51 performs the image analysis and, only in the case where the same target object as that of the analyzing unit 41 in the device 4 which is the transmission source of the alert corresponding information is detected in the in-the-period image data, the storage unit 52 may store the alert corresponding information.

At step S31, in response to the reception of the alert signal, the display control unit 71 of the monitoring terminal 7 reads from the file server 5 the alert corresponding information including the alert signal. In response to this, at step S33, the file server 5 may provide the monitoring terminal 7 with the access to the storage unit 52. Note that, if the device 4 transmits no alert signal, the display control unit 71 may receive the alert signal from the security sensor 2 without using the device 4.

At step S35, the display control unit 71 displays the in-the-period image data included in the alert corresponding information and the content of the alert signal on one or more displays (not shown). Note that, if the alert corresponding information including the in-the-period image data is transmitted from the communication unit 45 of the device 4 to the monitoring terminal 7, the display control unit 71 may display the in-the-period image data included in the received alert corresponding information and the alert signal without performing the process of step S31.

If the alert corresponding information includes a plurality of in-the-period image data shot by the plurality of monitoring cameras 3, the display control unit 71 may preferentially display the in-the-period image data where an object moving across images is detected, among these in-the-period image data. The detection of the object moving across images may be performed by the analyzing unit 51 of the file server 5 or may be performed by the analyzing unit in the monitoring terminal 7 which is not shown in the figure. Preferentially displaying particular in-the-period image data may mean displaying only the in-the-period image data or may mean displaying the in-the-period image data larger than another in-the-period image data.

Herein, the processes of steps S31 and S35 may be performed by the mobile terminal 8. In this case, the file server 5 provides the mobile terminal 8 with the access to the storage unit 52 and the in-the-period image data and the content of the alert signal are displayed in the mobile terminal 8. Thereby the situation of the monitored region can be checked by a security guard.

At step S 37, in response to the transmission of the alert corresponding information from one device 4 among the plurality of devices 4, the reporting unit 72 of the monitoring terminal 7 performs the reporting to the report destination corresponding to the one device 4.

[1-6. The Modified Example of the First Embodiment]

Note that in the above-described first embodiment it has been described that the communication unit 45 transmits the alert corresponding information including the in-the-period image data shot by each of the monitoring cameras 3 having the shot region corresponding to the location where the cause of the alert signal occurs, but it may also transmit the alert corresponding information including the shot in-the-period image data regardless of the shot region. For example, in response to one alert signal being obtained by the obtaining unit 42, the communication unit 45 may transmit the alert corresponding information including the plurality of the in-the-period image data obtained by the plurality of the monitoring cameras 3 during a reference duration including the occurrence time of the one alert signal and the content of the one alert signal. In this case, the situation in a wide region can be checked by the monitoring terminal 7.

Furthermore, it has been described that the alert corresponding information includes the alert signal and the in-the-period image data, but the alert corresponding information may include, instead of the in-the-period image data, the address of the in-the-period image data in the image storage unit 40. In this case, the communication cost between the device 4 and the file server 5 can be reduced in comparison with the case where the alert corresponding information including the in-the-period image data is transmitted. Furthermore, since the in-the-period image data in the image storage unit 40 is accessed based on the transmitted address, the time or cost required for accessing the image data in the device 4 can be reduced in comparison with the case where the image data of the entire period in the image storage unit 40 is accessed and the image data around the occurrence time of the alert signal is searched. Herein, if the alert corresponding information includes the alert signal and the address of the in-the-period image data, the monitoring terminal 7 may read the in-the-period image data indicated by the address from the image storage unit 40 of the device 4 and display the content of the alert signal included in the alert corresponding information and the in-the-period image data corresponding to the alert signal. Furthermore, the monitoring terminal 7 may cause the in-the-period image data which is read based on the address included in the alert corresponding information and the alert corresponding information to be stored in the file server 5 in association with each other.

Furthermore, it has been described that the delivery server 6 has the setting unit 64 which sets the operating condition of each image analysis engine in each of the devices 4, but it may have an instructing unit (not shown) which instructs each image analysis engine in the device 4 to perform the image analysis. In this case, the image analysis engine can perform the image analysis each time depending on the situation.

Furthermore, it has been described that the device 4 has the analyzing unit 41, the position storage unit 43, and the identifying unit 44, but it may not have at least one of them. For example, if the device 4 does not have the analyzing unit 41, it may output the alert corresponding information in response to the alert signal from the security sensor 2.

Furthermore, it has been described that the file server 5 has the analyzing unit 51, but it may not have the analyzing unit 51. In this case, the file server 5 may store all the received alert corresponding information.

2. Second Embodiment

[2-1. System 1A]

Figure 7:
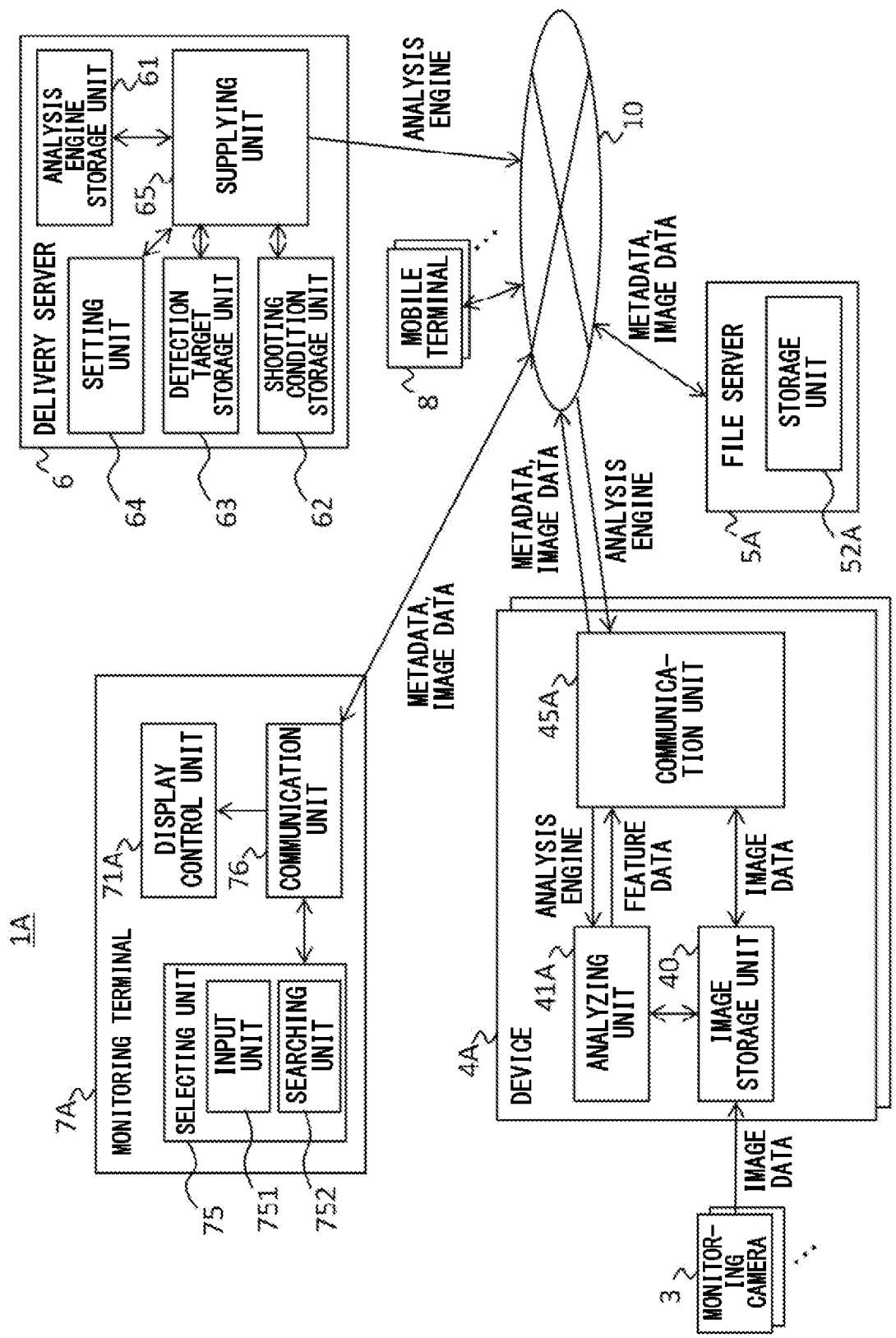
FIG. 7 shows a system 1A according to a second embodiment.

FIG. 7 shows the system 1A according to the second embodiment. In the system 1A according to the present embodiment, the same or substantially the same operations as that of the system 1 shown in FIG. 1 are given with the same labels and are not described.

The system 1A includes a device 4A, a file server 5A, and a monitoring terminal 7A. Note that although the security sensor 2 is not shown in FIG. 7, the system 1A may include one or more security sensors 2 which supply the alert signal to the monitoring terminal 7A.

[2-1.1. Device 4A]

The device 4A has an analyzing unit 41A and a communication unit 45A.

[2-1.1.1. Analyzing Unit 41A]

The analyzing unit 41A performs the image analysis on the image data and, in response to the detection of the target object to be detected among the objects which may be included in the image data, generates the feature data indicating the features of the target object. The analyzing unit 41A may perform the image analysis on the image data stored in the image storage unit 40 and may supply the feature data to the communication unit 45. The analyzing unit 41A may perform the image analysis for each of the monitoring cameras 3 and generate the feature data.

If the target object is a human face, the feature data may indicate a feature of a face within the image. The feature of the face within the image may be the positional relationship of the feature points of the face, may be the color of the pupil, the skin, or the hair, or may be the color, shape, or the like of an accessory (as one example, glasses, earrings, or the like). Furthermore, if the target object is a vehicle, the feature data may indicate the car model of the vehicle within the image. Furthermore, if the target object is the license plate, the feature data may indicate the number of the vehicle within the image.

Note that the number of types of the target objects may be one or may be multiple. If there is a plurality of target objects, the analyzing unit 41A may generate the feature data of at least one of the target objects. The feature data may be used as an identity to extract particular image data from the plurality of image data.

The analyzing unit 41A may use one or more image analysis engines (not shown) to perform the image analysis on the image data like the analyzing unit 41 in the first embodiment. In the present embodiment, as one example, the analyzing unit 41A may operate the plurality of image analysis engines in parallel or at different timings to perform the image analysis.

[2-1.1.2. Communication Unit 45A]

The communication unit 45A communicates with the file server 5A or the like via the communication network 10.

The communication unit 45A is one example of the transmitting unit and transmits to the file server 5A the metadata of the image data in which the feature data is generated. If the feature data is generated for the plurality of image data obtained by the plurality of monitoring cameras 3, the communication unit 45A may transmit the metadata for each of the plurality of monitoring cameras 3. The communication unit 45A may transmit the metadata every time when the content of the feature data changes.

Herein, the metadata may be the data indicating the content and location of the corresponding image data and may include feature data and at least one of the shooting time of the image data in which the feature data is generated or the address of the image data within the image storage unit 40.

If the metadata includes the shooting time, the metadata may further include a camera ID and a device ID. Furthermore, if the metadata includes the address of the image data within the image storage unit 40, the address may further indicate the address of the device 4A within the system 1A.

The communication unit 45A may receive the image analysis engine transmitted from the delivery server 6 and supply it to the analyzing unit 41, like the communication unit 45 in the first embodiment.

[2-1.2. File Server 5A]

The file server 5A is accessible to another apparatus (in the present embodiment, the monitoring terminal 7 or the mobile terminal 8, as one example) different from the device 4 and shares the stored file with other apparatuses. The file server 5A has a storage unit 52A.

The storage unit 52A stores the metadata transmitted from the device 4A. The storage unit 52A may further store the image data corresponding to the metadata in association with the metadata.

[2-1.3. Monitoring Terminal 7A]

The monitoring terminal 7A performs the monitoring of the monitored region. The monitoring terminal 7A has a selecting unit 75, a communication unit 76, and a display control unit 71A.

[2-1.3.2. Selecting Unit 75]

The selecting unit 75 selects any one of the metadata stored in the file server 5A in response to the operation by the operator. The selecting unit 75 may have an input unit 751 and a searching unit 752, and may select the metadata detected by the input unit 751 and the searching unit 752 and supply it to the communication unit 76.

The input unit 751 inputs the feature data of an object in response to the operation by the operator. The input unit 751 may supply the input feature data to the searching unit 752.

Herein, the feature data input by the operator may be the data indicating the feature of the object which is possibly shot by any of the monitoring cameras 3. For example, if police or the like requires information on a particular person or vehicle to be provided, the feature data input by the operator may be the data indicating the feature of the person or vehicle.

The searching unit 752 searches for the metadata including the input feature data, among a plurality of metadata stored in the file server 5A (in the present embodiment, the data including the feature data and at least one of the shooting time or the address of the image data, as one example).

[2-1.3.1. Communication Unit 76]

The communication unit 76 is one example of the reading unit and reads from the device 4 the image data corresponding to the selected metadata. The communication unit 76 may supply the read image data to the display control unit 71A.

Herein, if the metadata includes the shooting time, the image data corresponding to the metadata may be the image data shot at the shooting time or may be the image data shot in the reference duration including the shooting time. In the present embodiment, the reference duration is two minutes as one example, but it may also be a different duration such as 10 minutes or one day.

If the metadata further includes a camera ID and a device ID, the image data corresponding to the metadata may be the image data shot by the monitoring camera 3 corresponding to the camera ID among the image data stored in the device 4A corresponding to the device ID. If the metadata includes the device ID and does not include the camera ID, the image data corresponding to the metadata may be the image data shot by each of the monitoring cameras 3 among the image data stored in the device 4A corresponding to the device ID. If the metadata does not include the device ID or the camera ID, the image data corresponding to the metadata may be the image data shot by each of the monitoring cameras 3 among the image data stored in each of the devices 4A.

Furthermore, if the metadata includes the address of the image data within the image storage unit 40, the image data corresponding to the metadata may be the image data within the image storage unit 40 of the device 4A indicated by the address or may be the image data shot within the reference duration including the image data.

Furthermore, the communication unit 76 is one example of the storage control unit and causes the read image data to be stored in the file server 5A. The communication unit 76 may cause the read image data to be stored in the file server 5A in association with the metadata used for the reading.

[2-1.3.4. Display Control Unit 71A]

The display control unit 71A displays the image data read by the communication unit 76.

The device 4A of the above-described system 1A performs the image analysis on the image data obtained by the monitoring camera 3, generates the feature data indicating the feature of a preset object in response to the detection of the object, and transmits to the file server 5A the metadata including the feature data and at least one of the shooting time of the image data in which the feature data is generated or the address of the image data within the image storage unit 40. Thus, the metadata which is stored in the file server 5A can be used as an index for searching for the image data. Thereby, the access to the image data in which the feature data is generated among the image data within the device 4 is facilitated and an object which was present in the monitored region in the past can be easily found.

Furthermore, since the metadata is transmitted for each of the plurality of monitoring cameras 3, the object which was present in the monitored region can be more easily found.

Furthermore, since the metadata is transmitted every time the content of the feature data changes, the metadata is transmitted every time the object is switched. Thus, the access to the image data for each of the objects can be facilitated and the object which was present in the monitored region can be more easily found.

Furthermore, since the feature data indicating at least one of the features of the face within the image, the number of the vehicle within the image, or the car model of the vehicle within the image is generated and is included in the metadata, a person or a car which was present in the monitored region can be more easily found. Similarly, in a case where the feature data indicating, as the feature data of the target object, the feature of the whole body or clothes of a person, a vehicle (a vehicle in motion or a vehicle which is stopped), a car color, a particular object (a bag, a weapon), or the like is generated and included in the metadata, the target object which was present in the monitored region can also be more easily found.

Furthermore, since a plurality of image analysis engines operates in parallel or at different timings in the analyzing unit 41A, a target object which is present in the monitored region can be assured to be detected.

Furthermore, according to the monitoring terminal 7A of the above-described system 1A, any one of the metadata stored in the file server 5A is selected in response to the operation by the operator, and the image data corresponding to the selected metadata is read and displayed. Therefore, any image data in which the feature data is generated can be easily checked.

Furthermore, when the feature data of the object is input in response to the operation by the operator, the metadata including the input feature data among the plurality of metadata stored in the file server 5A is detected and displayed and thus the image data of the object corresponding to any feature data can be easily checked.

Furthermore, since the read image data is stored in the file server 5A, the image data corresponding to the selected metadata can be collected in the file server 5A. In addition, the image data in which the feature data is generated is prevented from being deleted due to overwriting or the like in the device 4A, and the image data can be assured to be saved.

[2-2. Operation of the System 1A]

[2-2.1. Delivery of the Image Analysis Engine]

Like the above-described first embodiment, the system 1A may perform a delivery operation of the image analysis engine. Thereby the image analysis engine for generating the feature data can be delivered to the device 4A.

[2-2.2. Monitoring]

Figure 8:
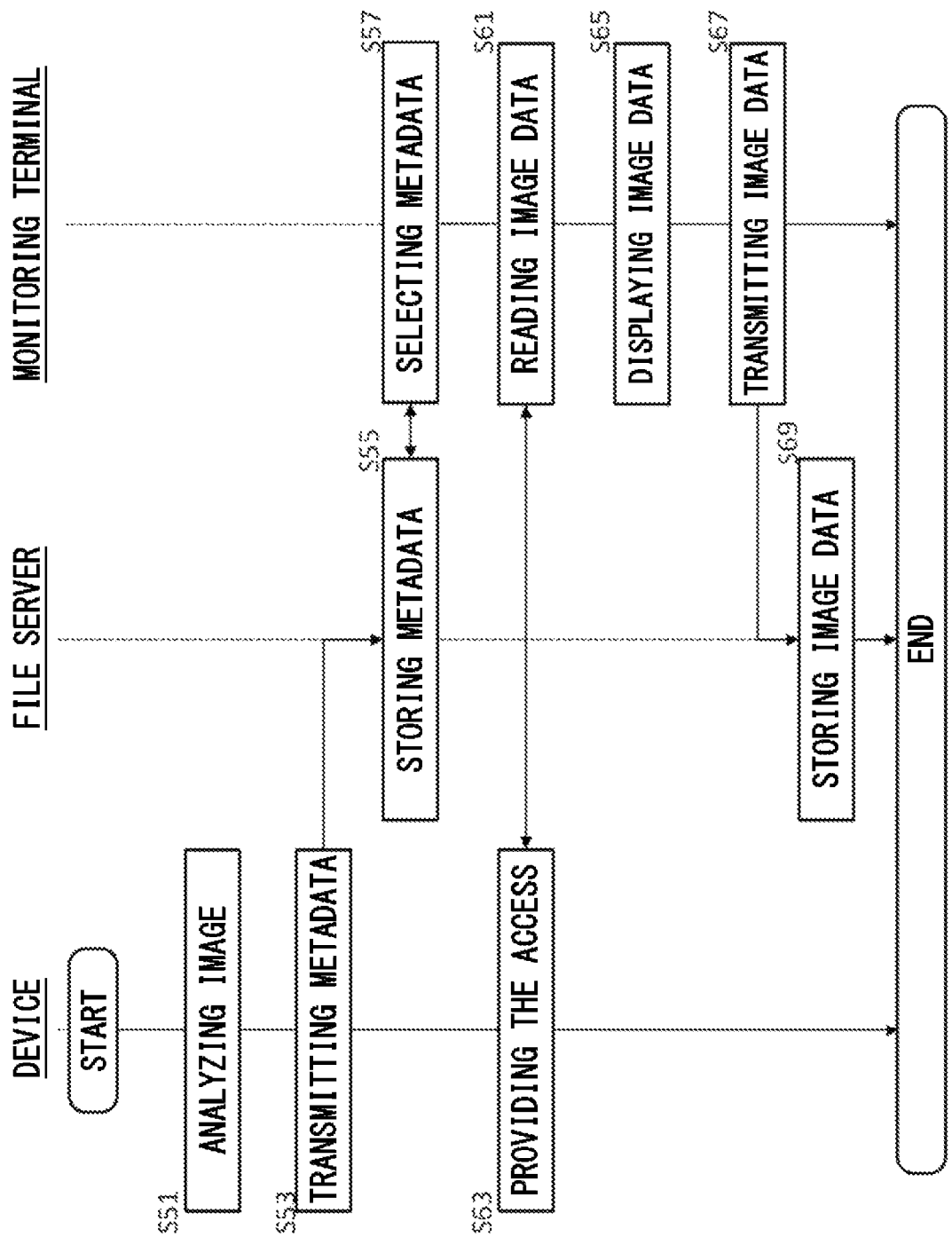
FIG. 8 shows an operation related to the monitoring.

FIG. 8 indicates an operation related to monitoring. The system 1A performs the monitoring of the monitored region by performing the processes of steps S51 to S69. Note that the device 4A may cause the image data obtained by the monitoring camera 3 to be stored in the image storage unit 40 during the operation.

At step S51, the analyzing unit 41A of the device 4A uses one or more image analysis engines to perform the image analysis on the obtained image data and, in response to the detection of a target object, generates the feature data indicating the feature of the object.

At step S53, the communication unit 45 generates the metadata including the feature data and at least one of the shooting time of the image data in which the feature data is generated or the address of the image data within the image storage unit 40 and transmits it to the file server 5A.

At step S55, the storage unit 52A of the file server 5A stores the transmitted metadata.

At step S57, the selecting unit 75 of the monitoring terminal 7A selects any one of the metadata stored in the file server 5A in response to the operation by the operator. In the present embodiment, as one example, the selecting unit 75 may select the metadata including the feature data input by the operator via the input unit 751.

At step S61, the communication unit 76 reads from the image storage unit 40 of the device 4 the image data corresponding to the selected metadata. In response to this, at step S63, the device 4A may provide the monitoring terminal 7 with the access to the image storage unit 40.

At step S65, the display control unit 71A of the monitoring terminal 7A displays the read image data. Note that the processes at steps S57, S61, and S65 may also be performed by the mobile terminal 8. In this case, the device 4 provides the mobile terminal 8 with the access to the image storage unit 40, and the mobile terminal 8 displays the read image data. Thereby the situation of the monitored region can be checked by a security guard.

At step S67, the communication unit 76 transmits the read image data to the file server 5A in association with the metadata. The communication unit 76 may perform the transmission in response to the instruction by the operator who has checked the displayed image.

Then, at step S69, the storage unit 52A of the file server detects the same metadata as the received metadata, among the plurality of metadata which has been stored, and stores the received image data in association with the metadata.

Note that in the above-described second embodiment it has been described that the image data corresponding to the metadata selected by the monitoring terminal 7A is read from the device 4A and is saved in the file server 5A, but the deletion of the image data corresponding to the metadata may be prevented through another method. For example, in order to prevent the image data in which the feature data is generated from being overwritten and deleted, the analyzing unit 41 of the device 4A may lock the image data within the image storage unit 40.

3. Modified Example of the First and Second Embodiment

Note that in the above-described first and second embodiment it has been described that the monitoring terminals 7, 7A and the delivery server 6 are distinct devices, but they may also be the same device.

Furthermore, it has been described that the delivery server 6 has the shooting condition storage unit 62, the detection target storage unit 63, and the setting unit 64 (or the instructing unit), but it may not have at least one of these units. For example, if the delivery server 6 does not have the setting unit 64 (or the instructing unit), the operating condition of the image analysis engine may be set at the side of the devices 4, 4A.

Furthermore, it has been described that the devices 4, 4A store the image data obtained by the monitoring camera 3 in the image storage unit 40, but the image data may be stored in response to the detection of the target object by the analyzing units 41, 41A. In this case, since the amount of the image data saved in the devices 4, 4A can be reduced, the devices 4, 4A may not transmit the alert corresponding data or the metadata to the file servers 5, 5A.

Furthermore, it has been described that the devices 4, 4A have the single analyzing units 41, 41A, but they may also have a plurality of analyzing units 41, 41A of the same type. In this case, the image analysis can be performed in parallel at a fast speed.

Also, various embodiments of the present invention may be described with reference to flowcharts and block diagrams. Blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits including logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing device, or to programmable circuitry locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

Figure 9:
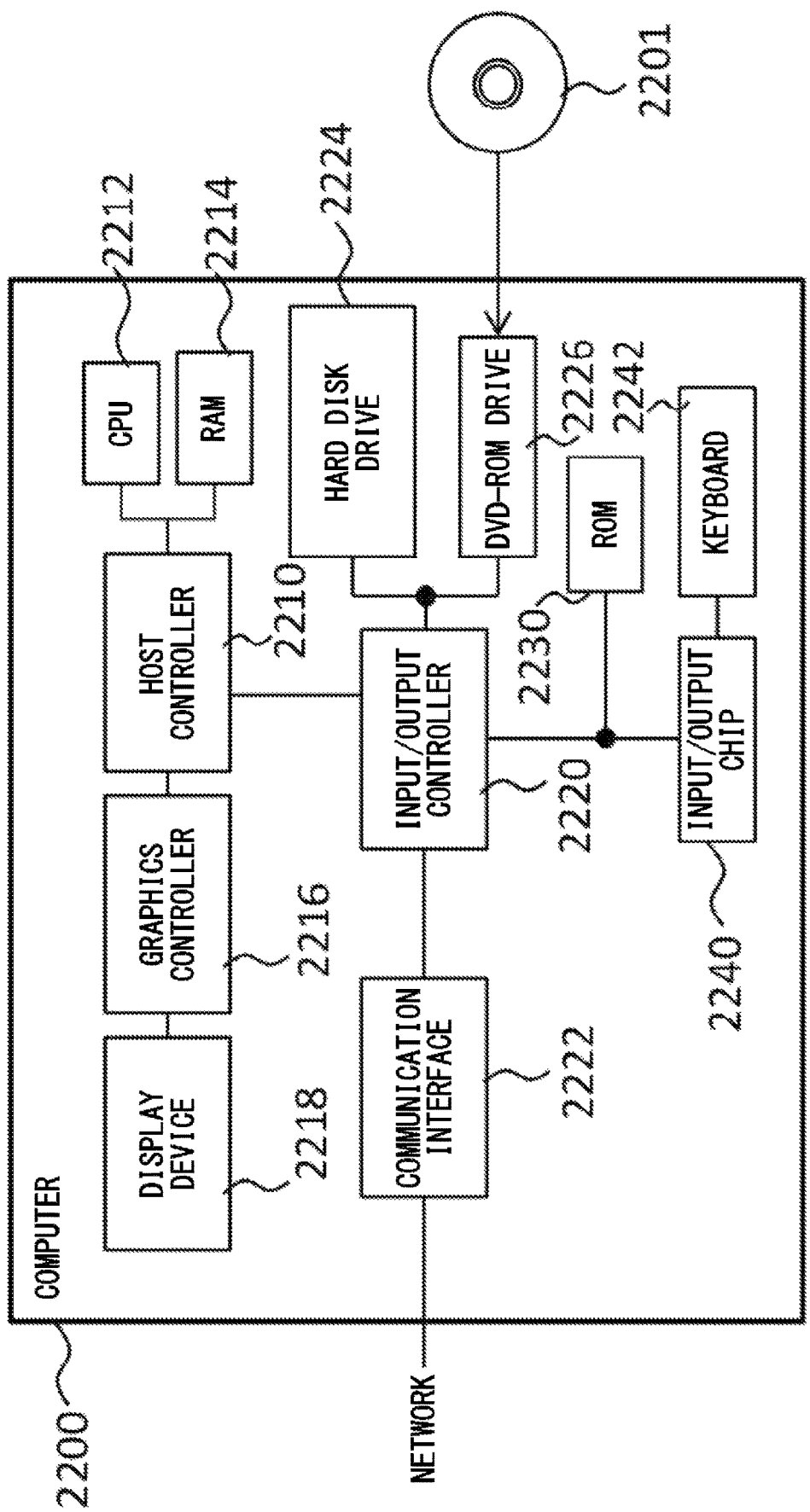
FIG. 9 shows an example of a computer 2200 through which a plurality of aspects of the present invention may be entirely or partially embodied.

FIG. 9 shows an example of a computer 2200 in which a plurality of aspects of the present invention may be implemented entirely or partially. A program that is installed in the computer 2200 can cause the computer 2200 to function as or perform operations associated with apparatuses of the embodiments of the present invention or one or more sections thereof, or perform the operations or the one or more sections, and/or cause the computer 2200 to perform processes of the embodiments of the present invention or steps of the processes. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphic controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphic controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port, or the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a storage medium such as the RAM 2214, the hard disk drive 2224, the DVD-ROM 2201, or the IC card, and transmits the read transmission data to a network or writes reception data received from a network to a reception buffering region or the like provided on the storage medium.

In addition, the CPU 2212 may cause all or a necessary portion of a file or a database to be read into the RAM 2214, the file or the database having been stored in an external storage medium such as the hard disk drive 2224, the DVD-ROM drive 2226 (DVD-ROM 2201), the IC card, etc., and perform various types of processing on the data on the RAM 2214. The CPU 2212 may then write back the processed data to the external storage medium.

Various types of information, such as various types of programs, data, tables, and databases, may be stored in the storage medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the storage medium. For example, when a plurality of entries, each having an attribute value of a first attribute associated with an attribute value of a second attribute, are stored in the storage medium, the CPU 2212 may search for an entry matching the condition whose attribute value of the first attribute is designated, from among the plurality of entries, and read the attribute value of the second attribute stored in the entry thereby obtaining the attribute value of the second attribute associated with the first attribute satisfying the predetermined condition.

The above-explained program or software modules may be stored in the computer readable media on or near the computer 2200. In addition, a storage medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1 system,
1A system,
2 security sensor,
3 monitoring camera,
4 device,
4A device,
5 file server,
5A file server,
6 delivery server,
7 monitoring terminal,
7A monitoring terminal,
8 mobile terminal,
10 communication network,
40 image storage unit,
41 analyzing unit,
41A analyzing unit,
42 obtaining unit,
43 position storage unit,
44 identifying unit,
45 communication unit,
45A communication unit,
51 analyzing unit,
52 storage unit,
52A storage unit,
61 analysis engine storage unit,
62 shooting condition storage unit,
63 detection target storage unit,
64 setting unit,
65 supplying unit,
71 display control unit,
71A display control unit,
72 reporting unit,
75 selecting unit,
76 communication unit,
751 input unit,
752 searching unit,
2200 computer,
2201 DVD-ROM,
2210 host controller,
2212 CPU,
2214 RAM,
2216 graphics controller,
2218 display device,
2220 input/output controller,
2222 communication interface,
2224 hard disk drive,
2226 DVD-ROM drive,
2230 ROM,
2240 input/output chip,
2242 keyboard

What is claimed is:

1. A delivery server which is configured to be connected to a plurality of devices which are each configured to use an image analysis engine to perform an image analysis on image data including a same target object obtained by a respective one of a plurality of monitoring cameras, the delivery server comprising:
    an analysis engine storage unit which is configured to store a plurality of image analysis engines for each of which a shooting condition of the image data appropriate for the image analysis is different; and
    a supplying unit which is configured to supply to two or more of the plurality of devices an image analysis engine corresponding to the shooting condition of the same target object included in the image data obtained by the plurality of devices, among the plurality of image analysis engines;
    a position storage unit which is configured to store a sensor ID of an alarm sensor associated with the target object.

2. The delivery server according to claim 1, wherein the supplying unit is configured to update the image analysis engine in each of the two or more of the plurality of devices with the image analysis engine which it supplies.

3. The delivery server according to claim 1, wherein the supplying unit is configured to add into each of the two or more of the plurality of devices the image analysis engine which it supplies.

4. The delivery server according to claim 1, further comprising a setting unit which is configured to set an operating condition of each image analysis engine in each of the plurality of devices.

5. The delivery server according to claim 1, further comprising an instructing unit which is configured to instruct each image analysis engine in each of the plurality of devices to perform an image analysis.

6. The delivery server according to claim 1, further comprising a shooting condition storage unit which is connected to each of the plurality of devices and is configured to store, for each of the plurality of devices, a shooting condition of an image data obtained by the device, wherein
    the supplying unit is configured to supply the same image analysis engine to each of the two or more of the plurality of devices which are configured to obtain the image data having at least partially the same shooting condition, among the plurality of devices.

7. The delivery server according to claim 1, further comprising a detection target storage unit which is connected to the plurality of devices and is configured to store, for each of the plurality of devices, the target object which is set for the device, wherein the supplying unit is configured to supply the same image analysis engine to each of the two or more of the plurality of devices which have the same target object among the plurality of devices.

8. A method comprising:

connecting a delivery server to a plurality of devices which are each configured to use an image analysis engine to perform an image analysis on image data including a same target object obtained by a respective one of a plurality of monitoring cameras;

storing a plurality of image analysis engines for each of which a shooting condition of image data appropriate for an image analysis is different; and supplying, to two or more of the plurality of devices which are each configured to use an image analysis engine to perform an image analysis on image data obtained by a each of the plurality of monitoring cameras, an image analysis engine corresponding to the shooting condition of the same target object included in the image data to be obtained by the two or more of the plurality of devices, among the plurality of image analysis engines;

storing a sensor ID of an alarm sensor associated with the target object.

9. A non-transitory storage medium which is configured to record a program which causes a computer of a delivery server which is configured to be connected to a plurality of devices which are each configured to use an image analysis engine to perform an image analysis on image data including a same target object obtained by a respective one of a plurality of monitoring cameras to serve as:

an analysis engine storage unit which is configured to store a plurality of image analysis engines for each of which a shooting condition of the image data appropriate for the image analysis is different; and a supplying unit which is configured to supply to two or more of the plurality of devices an image analysis engine corresponding to the shooting condition of the same target object included in the image data obtained by the plurality of devices, among the plurality of image analysis engines;

a position storage unit which is configured to store a sensor ID of an alarm sensor associated with the target object.

* * * * *